Sept. 23, 1924.  
G. H. WATERS  
TIRE CHAIN  
Filed March 15, 1924  
1,509,573
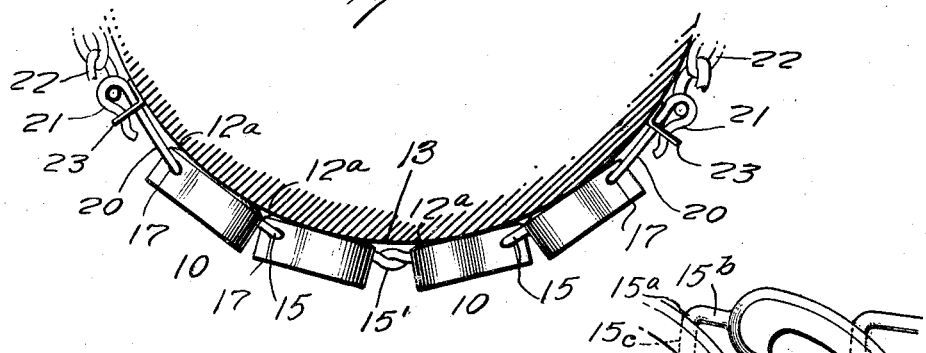
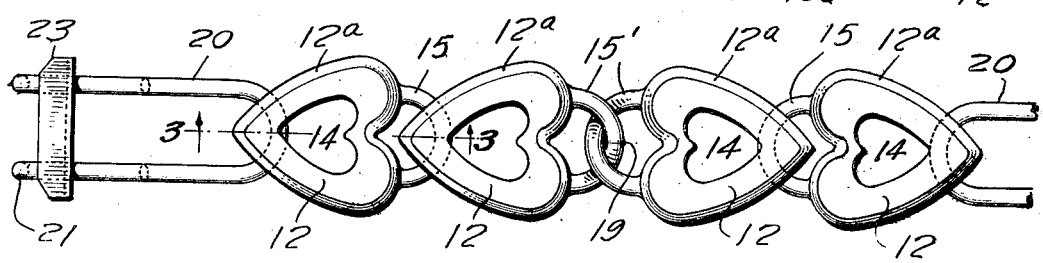
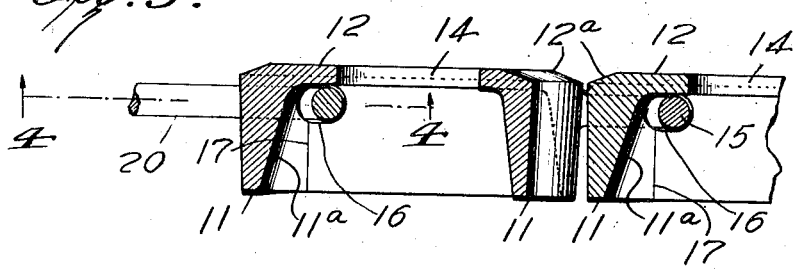
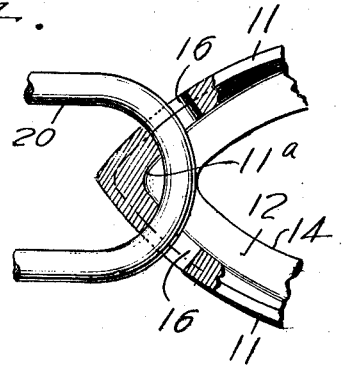
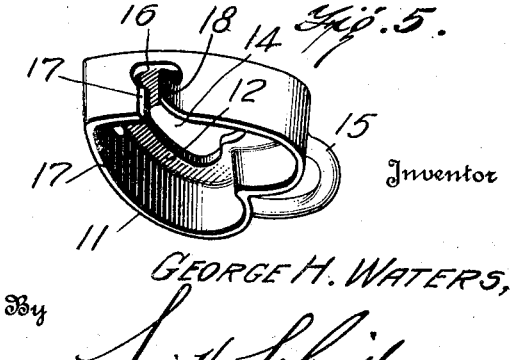
Inventor  
GEORGE H. WATERS,  
By *Attorney*

Patented Sept. 23, 1924.

1,509,573

UNITED STATES PATENT OFFICE.

GEORGE H. WATERS, OF GLENFIELD, NEW YORK.

TIRE CHAIN.

Application filed March 15, 1924. Serial No. 699,576.

*To all whom it may concern:*

Be it known that I, GEORGE H. WATERS, residing at Glenfield, county of Lewis, and State of New York, a citizen of the United States, have invented certain new and useful Improvements in Tire Chains, of which the following is a specification.

My invention relates to tire chains and has for an object to provide a cross chain for connecting the side chains of a tire chain organization which shall present new and improved features of convenience, wear, economy and traction facilities.

A further object of my invention is to provide a cross chain composed of a plurality of similar or preferably identical units with improved means for connecting the units into a series for transversely spanning a tread and improved means for connecting the cross chain to the side chains.

A further object of the invention is to provide a cross chain composed of a plurality of units of such shape and construction as to be formed by the drop forging of the same, whereby units of great wearing power and resistance can be cheaply and quickly produced, and interconnected to form a complete cross chain.

With these and other objects in view, the invention comprises certain novel parts, units, elements, constructions and combinations, as shown in the drawings, together with mechanical equivalents thereof, as will be hereafter more fully described and claimed.

My present invention is a further improvement over my Patent No. 1,484,596, which was patented February 19, 1924.

In the drawings:

Figure 1 is a view in edge elevation of the improved tire chain, shown in operative position upon a conventional tire;

Figure 2 is a view in plan of that side of the cross chain which lies next the tire in use;

Figure 3 is a sectional view through one of the units and a part of an adjoining unit on a line corresponding to the length of the chain, as indicated by line 3—3 of Figure 2;

Figure 4 is a detail horizontal sectional view taken on the line 4—4 of Figure 3;

Figure 5 is a view in perspective of one of the units, and

Figure 6 shows a fragmentary detail view of another embodiment of my invention.

My invention, in the form or embodiment shown in the drawing and briefly described, comprises the improved cross chain which forms the subject matter of this application and is made up of a plurality of units preferably identical, so that they may be produced from the same set of molds, dies or other devices, preferably though not necessarily or with any limiting effect, by drop forging or die-casting. These units, indicated at 10, for the purpose of resistance to skidding and increasing of traction, are preferably of the form ordinarily referred to as heart-shaped, the outline being in the form of a flange 11 extending entirely around the margin of said heart-shaped figure and with a base surface, 12, for contacting with the tire shown conveniently at 13, in Figure 1. For lightness of construction, as well as convenience in the production, the base 12 will preferably be provided with an opening, 14, shown in the figure as also heart-shaped, although the invention is in no way limited to the shape of this opening.

To prevent the various units, 10, of my improved tire chain from cutting into or injuring the tread of the automobile tire, I provide the base surface, 12, which is adjacent to the tire, with a bevelled or chamfered portion 12ᵃ.

I preferably form each unit 10, with a loop, 15, and each of said units is provided with a pair of oppositely disposed openings, 16, into which the loop of the proximate unit is received. To permit the requisite or desired flexibility of the assembled units, the loops 15 and the oppositely disposed openings, 16, are arcuate. This, of course, will readily permit each unit to move angularly relative to the other in all directions.

In order that the loops 15 may be readily placed into their respective openings, 16, for assembly, I preferably slit the flange 11, as indicated at 17 and provide a bent portion as clearly shown at 18 in Figure 5. Thus, it will be readily understood, the loops 15 may readily be placed into the openings 16 and the bent portion of the flange 18, when it is straightened, will effectually retain the loop 15 in its proper position.

At the center of the cross chain I prefer to interconnect the loops by means of cutting one of the loops, spreading them apart sufficiently to permit its co-acting or engaging loop to enter between the cut portions, after which the opposite cut ends of the loops 15' are again aligned and firmly secured together by means of spot or electric welding, or in any other suitable manner. In order that the opposing center links may lie in the same plane, I slightly twist their connecting loops 15'.

At the ends of the chain the openings 16 are provided with U-shaped connecting parts 20, which are provided with hooks, 21, for hooking into the side chains, 22, in the usual well-known manner, with sliding keepers, 23, for retaining the parts in such connection.

The manner of operation and use of cross chains in tire chains is so well known that, having shown the construction and assembly of the cross chain, its use and operation will be at once understood.

While I have illustrated the construction, which in its chain form and in details, has been found to be particularly effective for heavy duty trucks, as well as light duty automobiles, I do not wish to be limited to the details, as it is obvious that these might be changed in many ways without departing from the spirit of the invention as defined by or included within the terms or language of the appended claims.

It will be noted with special reference to Figure 3 that the forward end of each unit, at its outer or flanged end, is provided with an enlarged diverging angle, 11ª, which terminates and merges into the base plate, 12, for the purpose of strengthening that portion of each unit and prevent the pulling apart or rupture of the metal at this point.

When it is desired to use my invention in connection with a tire having a flat tread, I have found it is desirable to form the loops 15ª, as clearly shown in Figure 6, with substantially straight side portions 15ᵇ and end portions 15ᶜ. This construction, it will be readily seen, will permit the assembled chain to move freely about the flat tread of a tire.

What I claim is:

1. A cross chain, comprising a plurality of similar units, each unit having a tire engaging base and an outwardly extending flange, loops formed upon the units and extended in parallelism with the bases, each unit having near the end opposite to the loop end a pair of oppositely disposed openings extending through the flange thereof, said flange further provided with a slit extending from each opening to the outer edge of said flange, and means secured to the terminals of said assembly for attaching said assembly to side chains.

2. A cross chain, comprising a plurality of similar units, each unit having a bevelled tire engaging base and an outwardly extending flange, loops formed upon the units and extended in parallelism with the bases, each unit having near the end opposite to the loop end a pair of oppositely disposed loop engaging and elongated openings extending through the flange thereof, said flange further provided with a slit extending from each opening to the outer edge of the flange, and means secured to the terminals of said assembly for attaching said assembly to side chains.

3. A cross chain having a plurality of similar units consisting of an organization for attachment to side chains, each of said units comprising a substantially cup-shaped member having a bevel edged plate, an outwardly extending flange surrounding the plate, a loop integral with one end of the flange, a pair of oppositely disposed loop engaging openings in the flange opposite to said loop and having slits extending from said openings outwardly through the flange.

In testimony whereof I hereunto affix my signature.

GEORGE H. WATERS.